United States Patent

[11] 3,629,028

[72] Inventors Jack Lowrie McLarty
Milwaukee, Wis.;
Charles M. Hayes, Hoffman Estates; Edwin J. Latos, Chicago, both of Ill.
[21] Appl. No. 845,684
[22] Filed July 29, 1969
[45] Patented Dec. 21, 1971
[73] Assignee Universal Oil Products Company
Des Plaines, Ill.

[54] METHOD OF MAKING SELF-LUBRICATING FILAMENT WOUND TUBE
19 Claims, 2 Drawing Figs.
[52] U.S. Cl. .................................................. 156/175,
138/172, 156/196, 156/289, 156/321, 156/330
[51] Int. Cl. .................................................. B65h 81/00,
B31c 13/00
[50] Field of Search .................................................. 156/172,
173, 187, 145, 73, 392, 180, 285, 286, 196;
138/172

[56] References Cited
UNITED STATES PATENTS

| | | | |
|---|---|---|---|
| 3,042,569 | 7/1962 | Paul .............................. | 156/166 |
| 3,158,519 | 11/1964 | Shannon et al. .............. | 156/180 |
| 3,258,379 | 6/1966 | Ponemon et al. ............. | 156/175 |
| 3,281,299 | 10/1966 | Shobert ........................ | 156/175 |
| 3,366,522 | 1/1968 | Underwood .................. | 156/175 X |
| 3,484,317 | 12/1969 | Dickerson .................... | 156/175 |

*Primary Examiner*—Carl D. Quarforth
*Assistant Examiner*—E. E. Lehmann
*Attorneys*—James R. Hoatson, Jr. and Philip T. Liggett

ABSTRACT: A method of making a filament wound tube having smooth surfaces. Fiber glass filaments are passed through successive resin baths containing particles of a wear resistant additive. These resin baths are deaerated to reduce the existence of voids and pits in the resin in the finished tube. The filaments are flattened and are slowly helically wound in a first layer onto a mandrel. Subsequent layers are overwound about the first layer, the resin is cured, and the filament wound tube formed thereby is removed from the mandrel.

INVENTORS:
Jack Lowrie McLarty
Charles M. Hayes
Edwin J. Latos
James R. Hoalson, Jr.
Philip J. Liggett
BY: ATTORNEYS

METHOD OF MAKING SELF-LUBRICATING FILAMENT WOUND TUBE

This invention relates to a method of making a self-lubricating filament wound tube. More particularly, this invention is a method of manufacture in which fiber glass filaments are passed through successive resin baths containing particles of a wear resistant additive. These resin baths are deaerated to reduce the existence of voids or pits in the resin of the finished tube. The filaments are flattened and are slowly helically wound in a first layer about a mandrel. Subsequent layers are overwound about the first layer, the resin is cured and the filament wound tube formed thereby is removed from the mandrel.

Previously, several steps have been required to produce a satisfactory filament wound tube having surfaces impregnated with a wear resistant additive. In one method of producing such a tube, an inner layer of resin mixed with wear resistant additive is first coated onto a mandrel coated with a release agent, and the resin is allowed to cure to the B stage. Thereafter, the coated mandrel is helically overwound with fiber glass filaments. This procedure requires several steps, and substantial time for initial curing to the B stage is required while the tube and mandrel are positioned in the filament-winding machine. The multiple steps required in the manufacture of such a tube are unnecessary, and the curing of resin to a B stage unnecessarily ties up the filament-winding machine and reduces the possible rate of manufacture using the equipment available.

In another method of manufacturing a self-lubricating filament wound tube, fiber glass filaments are coated with a mixture of resin and wear resistant additive. The fiber glass filaments are immediately helically wound onto a mandrel, and thereafter the resin cures. The problem with this construction is that during winding, the resin is so mobile, or free-flowing, that the fiber glass filaments force their way through the resin to the surface of the mandrel. Also, the air entrapped in the resin and between the resin and the fiber glass filaments causes pits on the inner surface of the tube. Use of this self-lubricating tube as a cylinder for a pneumatic piston will shortly render the tube unserviceable because the piston abrades the fiber glass filaments as it works back and forth within the cylinder. Once abrasion begins, the cylinder is virtually useless.

In both of these methods of manufacture, the filament wound tube produced has a very low coefficient of friction, but the inner surface of the tube is not as smooth as it could be. That is, the surface is uneven so that when a piston reciprocates within a tube manufactured according to one of these methods, there is a greater tendency for pressure to leak across the piston than exists in the method of construction described herein. Unevenness of the tube surface has been a problem in the past because of the pits or craters formed by air bubbles in the resin at the surfaces of the tube which are largely retained during curing of the resin.

Furthermore, in all of the previous methods of producing a self-lubricating filament wound tube, air bubbles entrapped within the resin during curing create a weakness in the tube when it is subjected to various stresses. This occurs because the bubbles create a weakness in the resin bonds, which are the weakest bonds in the tube.

The primary object of this invention is to produce a self-lubricating filament wound tube in a single step operation. Neither preliminary coating of the filaments or mandrel with resin nor subsequent finishing operations are required to carry out the steps of this invention.

Another object of the invention is to produce a self-lubricating filament wound tube having smooth, even surfaces, as well as a low coefficient of friction. This is possible because air and other gas bubbles within the resin are driven out of the resin before the resin cures. Also, any air bubbles that adhere to the fiber glass filaments and would otherwise disrupt continuity of the resin coating are also driven off prior to curing. As a result, there are no craters or pits in the surfaces of the tube produced.

An additional object of this invention is to produce a filament wound tube which is stronger than conventional filament wound tubes. The increased strength is possible because of the elimination of the air and gas bubbles trapped within the walls of the filament wound tube. Air and gas bubbles trapped within the tube walls present weak points within the tube, and stresses on the tube will rupture the resin bonds at a lower stress than where there are no voids or trapped gas bubbles in the walls of the tube.

In a broad aspect this invention is a method of forming a filament wound tube having a smooth inner surface comprising the steps of: coating fiber glass filaments with resin by passing said filaments through a first resin bath of a mobile, uncured, liquid, thermosetting plastic resin containing particles of a wear resistant additive; deaerating said first resin bath as said filaments are being coated; passing said filaments through a second resin bath of the aforesaid resin and wear resistant additive to coat said filaments; deaerating said second resin bath as said filaments are being coated; drawing said fiberglass filaments through a constrictive aperture to remove excess resin from said filaments; flattening said filaments by bending said filaments across the surfaces of closely spaced guides; heating a mandrel; slowly helically winding a first layer of said fiber glass filaments onto said mandrel; helically overwinding subsequent layers of said filaments onto said mandrel; curing said resin, thereby forming a filament wound tube; and removing said tube from said mandrel.

By further restricting the manner of carrying out the steps of this invention, a product of even greater quality may be obtained. For example, it has been discovered that the filament wound tube produced is of superior quality when the wear resistant additive is graphite, molybdenum disulfide, titanium dioxide, or mica. Graphite, molybdenum disulfide, and titanium dioxide have previously been used as wear resistant additives in the art of filament winding, and their success is well known in the art. Mica, however, has been used as a lubricant in other fields, but never as a wear resistant additive in filament wound pipes. Finely divided copper has demonstrated excellent characteristics in increasing wear resistance by conducting heat from friction away from a tube surface.

An excellent self-lubricating filament wound tube is produced when the thermosetting plastic resin is an epoxy resin. While polyester resins and other resins may be used, shrinkage is greater in these resins. Since the most common use of such tubing is as apneumatic cylinder, the inner dimensions of the tube are particularly important in order to fall within the tolerance of the piston fit. The surface texture of the tube is improved when deaeration is effected by heating the resin baths, comprised of quantities of resin and wear resistant additive, to a temperature of from about 180° to about 300° F. Heating the resin will reduce the resin viscosity and will produce several favorable results. Air bubbles and gas bubbles more easily escape the resin when it is more mobile, that is, less viscous. Since the air bubbles are driven out of the resin baths, they do not become entrapped either at the surface of the mandrel or within the walls of the filament wound tube produced. The decreased viscosity, or increased mobility, of the resin also hinders the subsequent entrapment of air bubbles or gas bubbles while the fiber glass filaments are being wound onto the mandrel. As the filaments are fed onto the mandrel, the resin in a more mobile state will flow onto the surface of the mandrel or onto the interior layers of filaments and will thereby preclude air from becoming entrapped beneath the filaments.

An alternative to heating the resin is to deaerate the resin by subjecting the resin bath to ultrasonic vibrations. Ultrasonic vibration is created by an ultrasonic generator, which has commonly been used to clean intricate metal parts. When a liquid, such as liquid resin, is subjected to ultrasonic vibration, cavitation is set up in the liquid. That is, tiny bubbles are rapidly generated in the liquid, and just as rapidly collapse. The result is a great impact on any entrained air or other gas in the liquid. This impact tends to driveoff-entrapped gases from the liquid. Ultrasonic vibration need be applied to the liquid resin for only a matter of seconds before the resin is almost completely deaerated. Ultrasonic vibration is normally applied to the resin at a frequency of from 20,000 cycles per second to 50,000 cycles per second. Below 20,000 cycles per second sound waves are generated which are within the upper limits of human hearing and which could be annoying to any persons near by. Above 50,000 cycles per second an inordinate amount of power is required in order to produce the ultrasonic vibration.

It is also helpful if the mandrel is coated with a resin release agent prior to filament winding. Release agents are old in the art of filament winding and should be applied where there is any possibility that the resin used might otherwise stick to the surface of the mandrel. Where a chromium-steel mandrel is used, no release agent is necessary. For most other mandrels, a release agent will preclude the possibility that the inner surface of the filament wound tube produced might be damaged upon its removal from the mandrel.

In addition, the mandrel is often heated to a temperature of from about 180° to about 300° F. This heating may be from the interior of the mandrel through the use of a resistance heating element within the mandrel, or the heat may be applied from the exterior of the mandrel. In either event, heating is helpful in order to retain the mobility of the resin at the surface of the mandrel as the coated fiber glass filaments are wound onto the mandrel. The heat will also assist in curing the resin and reducing the fabrication time of the filament wound tube.

Using the preferred delivery system in carrying out the method of this invention, the first layer of fiber glass filaments is wound onto the mandrel at a filament speed of from about 5 to about 10 feet per minute. This speed is slow enough so that air is not entrapped beneath the fiber glass filaments as they are wound onto the mandrel. On the other hand, this speed is not too slow so that the mobile resin drips from the mandrel thereby allowing air bubbles to replace the resin on the mandrel. The closely spaced guides previously described are preferably fixed bars, spaced within 4 inches of each other, but the guides may alternatively be rollers. This close spacing allows the fiber glass filaments to be flattened as they pass to the distributing arm of the filament winding machine which helically winds the filaments about the mandrel. If the spaced rollers are more distant than 4 inches from each other the filaments resume a cylindrical shape and air is more likely to be entrapped beneath the filaments as they are wound onto the mandrel. While all of the filaments may be flattened by being bent across the surface of the same fixed bar, a different problem is presented where rollers are used. Where rollers are used there must be a separate roller at each spaced location for each fiber glass filament. Otherwise, the difference in speed at which the various filaments are drawn onto the mandrel will injure fibers being drawn across a single roller rotating at a fixed speed. Often there are rollers or fixed bars in the resin baths and the fiber glass filaments pass between the bars or rollers, and the bars or rollers vibrate in the resin baths, thereby further assisting in the deaeration of the resin. At the distributing arm, there is a ring, or toroidal solid through which the filaments pass as they are distributed onto the mandrel. The filaments are bent across the arc of the ring in the distributing arm to be flattened into a band of filaments. A flat band of filaments is the most desirable configuration in which the filaments are wound onto the mandrel.

Quite often a squeegee is positioned against the filaments as they are bent across the arc of the ring in the distributing arm, thereby further reducing the air entrained in the resin on the coated fiber glass filaments. The squeegee also removes excess resin from the filaments. While a ring is a desirable configuration for the element through which the fiber glass filaments pass in the distribution arm, any surface or distributing means which forms the filaments into a band is acceptable.

The method of this invention is more clearly illustrated in the accompanying drawings in which.

Figure 1:
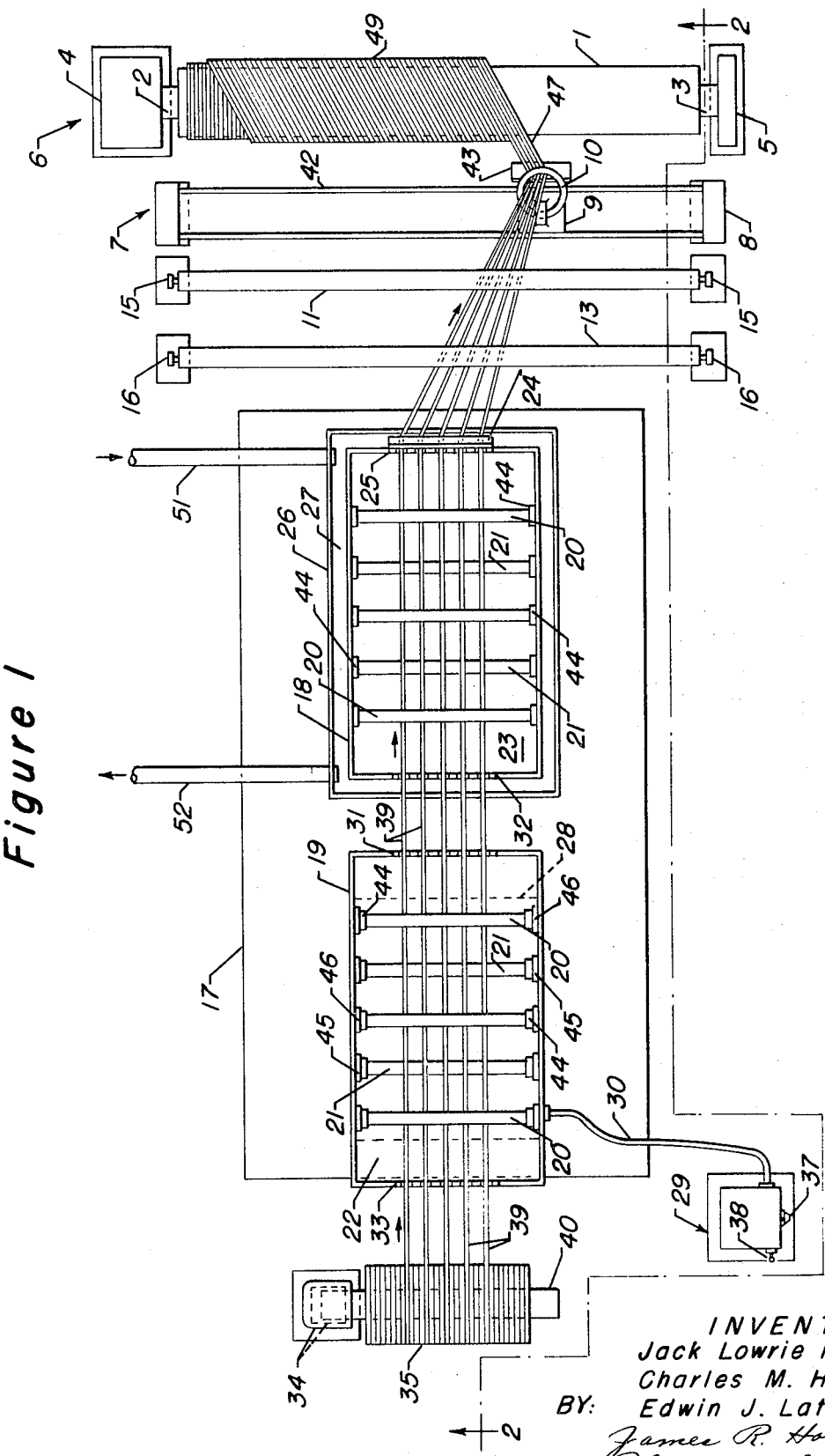
FIG. 1 is a plan view of apparatus used to perform this invention.

Referring now to the drawings, there is shown a mandrel 1 fastened by axles 2 and 3 to mandrel supports 4 and 5 respectively. Below mandrel 1 and along the length of mandrel 1 is located a radiant-heating element 41. This heating element 41 may be any type of conventional heating element, such as electrical resistance coils, a catalytic heating unit, or hot water. The radiant-heating element 41, depicted as a heating lamp, supplies sufficient heat to the surface of mandrel 1 to maintain mandrel 1 at a temperature from about 180° to about 300° F. A reasonably uniform temperature of the mandrel is maintained since mandrel 1 rotates during the filament winding process.

A distributing assembly 7 is comprised of upright supports 8 which carry an upper guide portion having two longitudinal rails 42. Rails 42 are parallel to mandrel 1 and run approximately the length of mandrel 1. A distributing arm 9 traverses the length of the upper guide portion of distributing assembly 7, and is confined between the rails 42. Fiber glass filaments are thereby fed onto mandrel 1 from the distributing arm 9. Distributing arm 9 is equipped with a ring 10 through which filaments are fed onto mandrel 1. Ring 10 is positioned so that as filaments contact ring 10, they are bent across the arc of ring 10 in distributing arm 9 to be flattened into a band of filaments. A squeegee 43 if fastened to the underside of ring 10 and is positioned against the filaments as they are bent across the arc of ring 10. Squeegee 43 removes excess resin from the filaments and reduces the amount of air entrained in the resin-coated fiber glass filaments.

On a bench 17 are located two containers or vats 18 and 19. Vat 18 contains a quantity of resin and particles of a wear resistant additive. This composite mixture will be referred to as resin bath 23. Similarly, vat 19 contains a quantity of resin and wear resistant additive which will be referred to as resin bath 22. Vat 19 is located atop a vibration plate of a vibration unit 28 of an ultrasonic generator. This ultrasonic generator is comprised of a transducer unit 29 and vibration unit 28 interconnected by cable 30. On transducer unit 29 there is located a frequency control 36, a power control 37, and a toggle switch 38, which turns the unit off and on. When the ultrasonic generator is turned on, crystals within vibration unit 28 vibrate at an ultrasonic frequency against the bottom of vat 19. These vibrations subject resin bath 22 to ultrasonic vibration, thereby effecting deaeration of resin bath 22. The frequency of ultrasonic vibration is normally at a frequency of from 20,000 cycles per second to 50,000 cycles per second.

An alternative method of deaerating a resin bath is employed to deaerate resin bath 23. Vat 18 is positioned in a pan 26 which contains hot oil 27. The hot oil 27 is periodically or continuously replaced or supplemented with additional hot oil through pipe 51 in order to maintain a temperature in pan 26 sufficient to heat the resin bath 23 to a temperature of from about 180° to about 300° F. Oil may be removed from pan 26 through pipe 52. Heating resin bath 23 to this temperature will deaerate the resin bath and in addition will make the resin bath more mobile, that is, less viscous, in order to effect deaeration. The increased mobility of the resin bath 23 has beneficial side effects in that it reduces the air subsequently entrapped beneath the filaments as the coated filaments are wound onto mandrel 1 because a more mobile resin will flow more freely onto mandrel 1 without allowing air to be entrapped beneath the filaments wound thereon. Either the ultrasonic or the heating method of deaeration may be employed and the methods of deaeration may be used interchangeably. Normally, the same method of deaeration will be applied to both of the resin baths 22 and 23, but for purposes of illustration, the alternative methods are depicted in the drawings.

The resin in the resin baths 22 and 23 is a mobile, uncured liquid, thermosetting plastic resin, which preferably is an epoxy resin. An epoxy resin is advantageous in that it shrinks less during curing, and it retains a more stable degree of mobility over a wider temperature range than do polyester resins and other resins. The stability of mobility is desirable because it tends to prevent the resin coating at the interior surface of a tube formed on mandrel 1 from becoming too thin. Too thin a resin layer will cause the fiber glass filaments to suffer abrasion when the tube is in use as a pneumatic or hydraulic cylinder. This would occur if the mobility were too great and the tension in the fiber glass filaments forced the filaments through, or partially through, the inner resin layer during winding. If the mobility of the resin were not great enough, air would become entrapped beneath the layers of filament fibers during helical winding of a tube on mandrel 1 and cause internal voids and surface roughness in the tube.

The wear resistant additive used in the resin baths 22 and 23 may be any of a number of wear resistant additives, such as graphite, molybdenum disulfide, titanium, dioxide, finely divided metallic copper and mica. These wear resistant additives may be used in combination with each other or in the alternative with respect to each other as long as no adverse chemical reactions are set up in the resin system used.

The two vats 18 and 19 illustrated in the drawings are necessary because deaeration can not be accomplished quickly enough to prevent air bubbles from reforming in the resin and adhering to the fiber glass filaments as they are drawn through the resin if only one vat is used. This is because as the fiber glass filaments are initially drawn into a resin bath, bubbles of air are drawn in along with the filaments. As a result, resin bath 22 becomes thoroughly saturated with air bubbles which cannot be driven off quickly enough for resin bath 22 to be a good resin base. Because the filaments are partially coated with resin from resin bath 22 as they enter resin bath 23, less air is entrapped and carried into resin bath 23. As a result, resin bath 23 is generally less saturated with air bubbles and thereby functions as a more suitable resin base when coated onto the fiber glass filaments which are wound onto the mandrel 1. The use of a single vat would be similar to passing fiber glass filaments through resin bath 22 and then directly onto mandrel 1.

Within vats 18 and 19 are located a series of closely spaced fixed bars 20 and 21. These bars are identical in all respects except that the bars 21 are positioned on a horizontal plane above bars 20 within each vat. The ends of all of the bars 20 and 21 fit snugly into annular collars 44 which are appropriately positioned within each of the vats 18 and 19. Each of the bars 20 and 21 is thereby fixed between a pair of opposing collars 44. The collars 44 in vat 18 are fastened to the inside walls of vat 18. Collars 44 instead of being mounted on the walls of the vat 19, are mounted on posts 45 and 46 extending up from the floor of vat 19. A series of short posts 46 extend up to the collars 44 that hold the bars 20, and a series of taller posts 45 extend up to the collars 44 holding bars 21. It can be seen that the bars 20 and 21 in vat 19 will thereby vibrate along with the floor of vat 19 as a result of the ultrasonic vibrations set up in vibration unit 28. As the filaments pass between the bars 20 and 21, the bars 20 and 21 vibrate in the resin bath 22 and thereby contribute even further to the deaeration of the resin bath 22. The vibrating bars 20 and 21 in vat 19 are especially effective in removing air entrapped next to the fibers passing therebetween. While these bars in vat 19 vibrate in response to the ultrasonic frequency generated, a much lower frequency is sufficient to cause the air to be removed from next to the filament fibers passing between the bars 20 and 21.

Between the vats containing the resin baths and the distributing assembly 7 are located a series of closely spaced guides. These guides are comprised of upright posts between which are mounted pairs of bars. As illustrated in the drawings, two posts 16 are mounted adjacent to vat 18. At the upper ends of posts 16 are mounted bars 13 and 14. The fiber glass filaments pass between bars 13 and 14 and are flattened by being bent across the surfaces of these bars. Similarly, upright posts 15 are located adjacent to the distributing assembly 7 and hold bars 11 and 12 therebetween. As the resin impregnated fiber glass filaments pass between bars 13 and 14 and later between bars 11 and 12, the fiber glass filaments are bent first across the surfaces of the bars 13 and 14 and then across the surfaces of the bars 11 and 12 so that they are flattened. These pairs of bars must be spaced a maximum longitudinal distance of 4 inches from each other as measured along the fiber glass filaments to fully preserve the flattening effect achieved.

Figure 2:
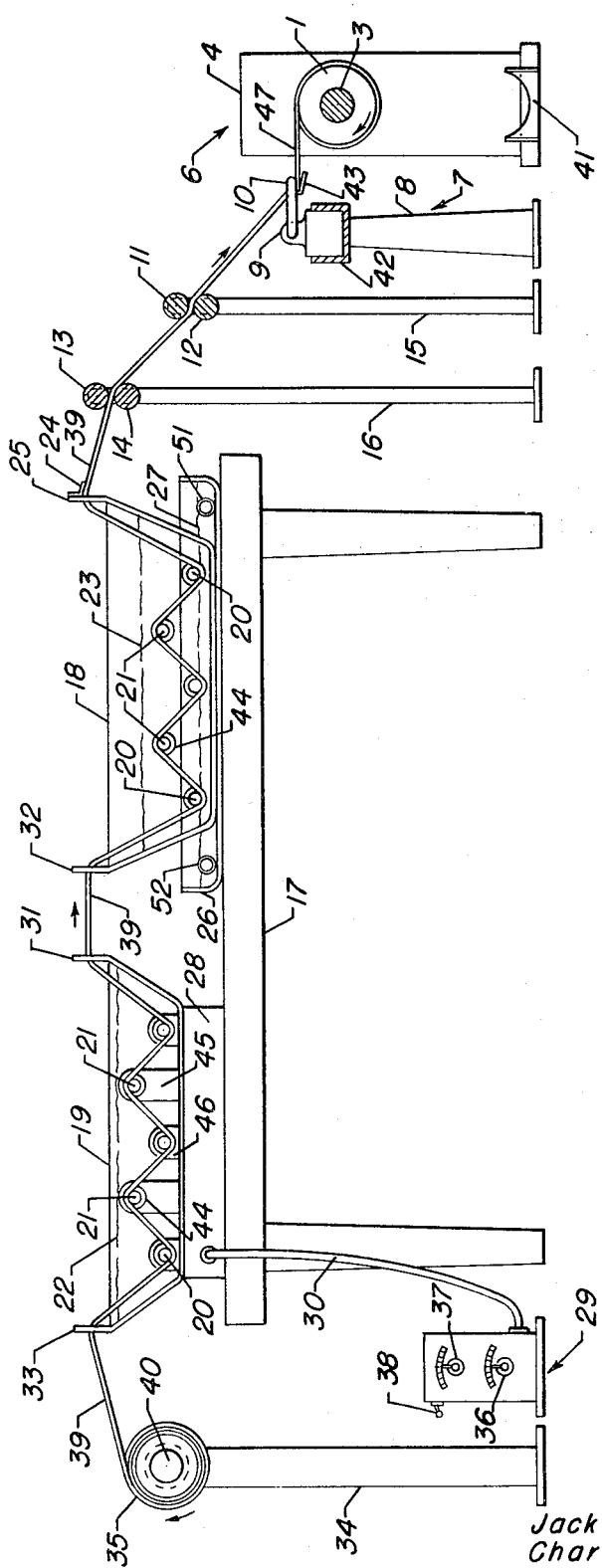
FIG. 2 is a side elevational view along the section lines 2—2 of FIG. 1.

In the filament-winding operation, mandrel 1 is first coated with a conventional resin release agent to facilitate removal of the cured self-lubricating fiber glass filament wound tube produced as an end result of the method of this invention. Mandrel 1 is thereafter heated by heating element 41. Several fiber glass filaments 39 are drawn in parallel from a spool 35 which is mounted on a post 34 by an axle 40. The fiber glass filaments 39 are drawn between a series of upright teeth 33 mounted at the rear edge of vat 19. The teeth 33, along with subsequent rows of teeth, guide the fiber glass filaments in a substantially parallel motion. The fiber glass filaments 39 pass from between the teeth 33, beneath a first bar 20 and above a first bar 21. Thereafter the fiber glass filaments 39 pass under subsequent bars 20 and over subsequent bars 21. During this time the bars 20 and 21 are vibrating and the resin bath 22 is subjected to ultrasonic vibration by means of the ultrasonic generator. The resin bath 22 is thereby deaerated. Deaeration is particularly intense at the fiber glass filaments 39 as they pass across the bars. The fiber glass filaments 39 emerge from the resin bath 22 and pass between guiding teeth 31 mounted at the edge of vat 19. The filaments pass across the gap between vats 19 and 18 and through subsequent guiding teeth 32 mounted at the rear edge of vat 18. The fiber glass filaments 39 pass into resin bath 23 which is heated to deaerate resin bath 23. The resin further coats the fiber glass filaments 39 and the fiber glass filaments 39 are again passed under bars 20 and over bars 21. Fiber glass filaments 39 emerge from resin bath 23 and are passed between guide teeth 25 at the front edge of vat 18. There is a squeegee 24 attached to guide teeth 25 which, together with the edge of vat 18, forms a narrow constrictive aperture through which fiber glass filaments 39 are drawn in order to remove excess resin from the filaments 39. The filaments 39 thereafter are bent across the surfaces of bars 13 and 14 and bars 11 and 12 and are drawn through ring 10 in distributing arm 9. The bars 11, 12, 13, and 14 and the ring 10 together flatten the filaments 39 into a band 47. Distributing arm 9 slowly travels in the direction indicated by the arrow in FIG. I as mandrel 1 is rotated clockwise, as indicated in FIG. 2 at a speed calculated to draw the band 47 of filaments onto mandrel 1 at a rate of from about 5 to about 10 linear feet per minute. This speed is sufficient to prevent resin from dripping from mandrel 1 yet is slow enough so that air does not become entrapped beneath the band 47 as it is wound onto mandrel 1. This slow helical winding is continued while distributing arm 9 initially traverses the length of mandrel 1, thereby forming a first layer 49 of resin impregnated wound fiber glass filaments. Thereafter, subsequent layers of the band of fiber glass filaments are helically overwound onto first layer 49. This subsequent helical winding is usually at a greater rate of speed that was the first layer of filament winding. After filament winding is complete, filaments 39 are cut and the mandrel 1 continues to rotate while the resin coating on filaments 39 is allowed to cure. This normally takes about an hour at room temperature, or 1 to 10 minutes using a microwave oven. Thereafter mandrel 1 is removed from mandrel holders 4 and 5 and the filament wound tube produced from the cured layers of resin impregnated fiber glass filaments is allowed to cure still further for approximately 1 to 2 hours if cured by a conventional hot air oven, or for about a day at room temperature. Thereafter mandrel 1 is removed, and the cured self-lubricating fiber glass filament wound tube is ready for use.

The following examples are further illustrative of the method of this invention:

EXAMPLE I 172 parts by weight of an epoxy resin and an anhydride curing agent are mixed with about 17 parts by weight of molybdenum disulfide. Approximately one-half of this mixture is placed in each of two vats. Each of the vats contains a number of spools, or rollers on each of several roller axles. These axles are alternately spaced above and below the adjacent roller axles in each vat. The axles are connected by posts to the bottom of the vat, which in turn is subjected to ultrasonic vibrations of 38,000 cycles per second by an ultrasonic generator. The ultrasonic vibration and the vibration of the rollers deaerates the resin bath in each of the vats. A mandrel is heated to a temperature of 200° F. and is coated with a conventional resin release agent. Fiber glass filaments are passed through a first vat alternatively under and over the rollers described. Each filament passes over a separate roller on each roller axle because the speed of travel of each of the filaments varies somewhat. The fiber glass filaments are coated with resin and particles of molybdenum disulfide and emerge from the first vat and are passed into a second vat through a second resin bath. Again the fiber glass filaments are passed alternately under and over vibrating rollers. The fiber glass filaments are thereby thoroughly coated with resin and particles of molybdenum disulfide, while the second resin bath is deaerated by being subjected to ultrasonic vibrations of 38,000 cycles per second. The fiber glass filaments thereafter emerge from the second resin bath and are drawn through a constrictive aperture to remove excess resin from the filaments. The filaments pass from the aperture and are bent across closely spaced guides, so as to become flattened. The filaments thereafter pass through a ring attached to a filament distributing arm of a filament winding machine. The filaments are bent across the arc of the ring and are flattened into a band of filaments which is would about the mandrel at a speed of 7 linear feet per minute to form a first layer of resin impregnated fiber glass filaments on the mandrel. Thereafter, the speed is increased and subsequent layers of the band of fiber glass filaments are helically overwound about the first layer. After a sufficient number of layers are wound, usually 10 to 12 layers, winding of the band of filaments is discontinued. The mandrel continues to slowly rotate, however, in order to keep the resin from dripping off of the mandrel. This slow rotation is continued for about an hour during which time the resin cures to form a self-lubricating fiber glass filament-reinforced tube. The mandrel is removed from the filament-winding machine, and the tube is allowed to cure still further on the mandrel for about 1 hour at 300° F. using a conventional infrared or hot air oven. Thereafter the tube is removed from the mandrel and is ready for use.

EXAMPLE II 172 parts by weight of an epoxy resin and an amine curing agent are mixed with about 17 parts by weight of molybdenum disulfide. Approximately one-half of this mixture is placed in each of two vats. Each of the vats is heated to a temperature of about 220° F. thereby deaerating the resin mixture and rendering the resin mixture more mobile. A mandrel is heated to a temperature of 200° F. and is coated with a conventional resin release agent. Fiber glass filaments are passed through a first of the vats thereby becoming coated with resin and particles of molybdenum disulfide while air entrapped in the resin is driven off by the heat applied therein. The filaments emerge from the first vat and are passed into the second of the vats and through a second resin bath. Again the fiber glass filaments are coated with the resin mixture while the resin mixture is deaerated. The fiber glass filaments are thereby thoroughly coated with resin and particles of molybdenum disulfide. The fiber glass filaments thereafter emerge from the second resin bath and are drawn through a constrictive aperture to remove excess resin from the filaments. The filaments pass from the aperture and are bent across closely spaced guides, so as to become flattened. The filaments thereafter are fed onto the mandrel as it rotates by a filament distributing arm of a filament-winding machine. The mandrel is rotated at a speed of 9 linear feet per minute to form a first layer of resin impregnated fiber glass filaments on the mandrel. Thereafter, the speed is increased and subsequent layers of the fiber glass filaments are helically overwound about the first layer. After a sufficient number of layers are wound, usually 10 to 12 layers, winding of the band of filaments is discontinued. The mandrel continues to slowly rotate, however, in order to keep the resin from dripping off of the mandrel. This slow rotation is continued for about 2 hours during which time the resin cures to form a self-lubricating fiber glass filament reinforced tube. The mandrel is removed from the filament-winding machine, and the tube is allowed to cure still further on the mandrel for about 1 hour at 300° F. using a conventional infrared or hot air oven. Thereafter the self-lubricating filament wound tube is removed from the mandrel and is ready for use.

EXAMPLE III

The method of example I is repeated with a polyester resin and a styrene cross-linking agent being substituted for the epoxy resin and anhydride curing agent, and with particles of graphite being substituted for the particles of molybdenum disulfide.

EXAMPLE IV

The method of example I is repeated with particles of mica substituted for particles of molybdenum disulfide.

EXAMPLE V

The method of example I is repeated with particles of titanium dioxide substituted for particles of molybdenum disulfide.

EXAMPLE VI

The method of example I is repeated with particles of finely divided metallic copper substituted for the particles of molybdenum disulfide.

The foregoing detailed description and the accompanying drawings have been given for clearness of understanding only, and no unnecessary limitations should be construed therefrom, as other modifications and variations will be obvious to those skilled in the art.

I claim as my invention:

1. A method of forming a filament wound tube having a smooth inner surface comprising the steps of:
   a. coating fiber glass filaments with resin by passing said filaments through a first resin bath of mobile, uncured, liquid, thermosetting, plastic resin containing particles of a wear resistant additive.
   b. deaerating said first resin bath as said filaments are being coated,
   c. passing said filaments through a second resin bath of the aforesaid resin and wear resistant additive to coat said filaments,
   d. deaerating said second resin bath as said filaments are being coated,
   e. drawing said fiber glass filaments through a constrictive aperture to remove excess resin from said filaments,
   f. flattening said filaments by bending said filaments across the surfaces of closely spaced guides,
   g. heating a mandrel,
   h. slowly helically winding a first layer of said fiber glass filaments onto said mandrel,
   i. helically overwinding subsequent layers of said filaments onto said mandrel,
   j. curing said resin thereby forming a filament wound tube, and
   k. removing said tube from said mandrel.

2. The method of claim 1 further characterized in that said mandrel is heated to a temperature of from about 180° to about 300° F.

3. The method of claim 1 further characterized in that deaeration is effected by heating said resin baths to a temperature of from about 180° to about 300° F.

4. The method of claim 1 further characterized in that deaeration is effected by subjecting said resin baths to ultrasonic vibration.

5. The method of claim 4 further characterized in that ultrasonic vibration is at a frequency of from 20,000 cycles per second to 50,000 cycles per second.

6. The method of claim 1 further characterized in that said wear resistant additive is molybdenum disulfide.

7. The method of claim 1 further characterized in that said wear resistant additive is graphite.

8. The method of claim 1 further characterized in that said wear resistant additive is titanium dioxide.

9. The method of claim 1 further characterized in that said wear resistant additive is mica.

10. The method of claim 1 further characterized in that said wear resistant additive is finely divided metallic copper.

11. The method of claim 1 further characterized in that said first layer of said fiber glass filaments is wound onto said mandrel at a filament speed of from about 5 to about 10 feet per minute.

12. The method of claim 1 further characterized in that said thermosetting plastic resin is an epoxy resin.

13. The method of claim 1 further characterized in that said closely spaced guides are comprised of rollers, spaced within 4 inches of each other.

14. The method of claim 1 further characterized in that said closely spaced guides are comprised of bars, spaced within 4 inches of each other.

15. The method of claim 14 further characterized in that said filaments are bent across the arc of a ring in the distributing arm of be flattened into a band of filaments.

16. The method of claim 15 further characterized in that a squeegy is positioned against said filaments as they are bent across the arc of the aforesaid ring, thereby further reducing the air entrained in the aforesaid coated fiber glass filaments.

17. The method of claim 1 further characterized in that there are rollers in said resin baths, and said filaments pass between said rollers, and said rollers vibrate in said resin baths thereby deaerating said resin baths.

18. The method of claim 1 further characterized in that there are bars in said resin baths, and said filaments pass between said bars, and said bars vibrate in said resin baths thereby deaerating said resin baths.

19. The method of claim 1 further characterized in that said mandrel is coated with a resin release agent prior to filament winding.

* * * * *